(12) United States Patent
Janke et al.

(10) Patent No.: US 7,945,608 B2
(45) Date of Patent: May 17, 2011

(54) METHOD AND APPARATUS FOR GENERATING AN INITIAL VALUE FOR A PSEUDO-RANDOM NUMBER GENERATOR

(75) Inventors: Marcus Janke, Munich (DE); Peter Laackmann, Munich (DE)

(73) Assignee: Infineon Technologies AG, Neubiberg (DE)

( * ) Notice: Subject to any disclaimer, the term of this patent is extended or adjusted under 35 U.S.C. 154(b) by 1019 days.

(21) Appl. No.: 11/756,311

(22) Filed: May 31, 2007

(65) Prior Publication Data

US 2008/0016135 A1 Jan. 17, 2008

(30) Foreign Application Priority Data

Jul. 13, 2006 (DE) .................. 10 2006 032 419

(51) Int. Cl.
*G06F 7/58* (2006.01)
(52) U.S. Cl. ..................................................... 708/251
(58) Field of Classification Search ........... 708/250–256
See application file for complete search history.

(56) References Cited

U.S. PATENT DOCUMENTS

| 5,117,380 A | | 5/1992 | Tanagawa et al. |
| 5,864,531 A | * | 1/1999 | Horigome ................ 369/124.04 |
| 5,943,637 A | * | 8/1999 | Okumura et al. ............. 702/111 |
| 2007/0255547 A1 | * | 11/2007 | Estep et al. ..................... 703/15 |

FOREIGN PATENT DOCUMENTS

| DE | 690 25 633 T2 | 11/1996 |
| DE | 10 2005 009 190 B3 | 5/2006 |
| WO | WO 2006/092221 A1 | 9/2006 |

* cited by examiner

*Primary Examiner* — Tan V Mai
(74) *Attorney, Agent, or Firm* — Dickstein Shapiro LLP

(57) ABSTRACT

Apparatus and method for generating an initial value for a pseudo-random number generator, with an oscillator configured to generate an oscillator signal; and a generator configured to generate the initial value based on the oscillator signal at least during part of a transient of the oscillator.

24 Claims, 4 Drawing Sheets

US 7,945,608 B2

METHOD AND APPARATUS FOR GENERATING AN INITIAL VALUE FOR A PSEUDO-RANDOM NUMBER GENERATOR

CROSS-REFERENCE TO RELATED APPLICATIONS

This application claims priority from German Patent Application No. 10 2006 032 419.6, which was filed on Jul. 13, 2006, and is incorporated herein by reference in its entirety.

TECHNICAL FIELD

This invention refers to an apparatus and a method for producing an initial value for a pseudo-random number generator, such as used e.g. in smart cards.

BACKGROUND

An object, which has often to be solved in security controllers is the generation of random numbers, and in particular of true random numbers such as they can be generated by a true random-number generator. True random-number generators are also called True RNGs (RNG=Random Number Generator). The implementation of such True RNGs is complex and cost-intensive. Therefore, pseudo-random number generators, so-called PRNGs (PRNG=Pseudo Random Number Generator), are often used, which however generate sequences of numbers based on a deterministic algorithm, starting from an initial value, which, when the algorithm is known, can in principle be discovered by unauthorized people and, hence, are no longer random.

As pseudo-random numbers are considered sequences of numbers, which are calculated by a deterministic algorithm in a pseudo-random number generator and, hence, are not random, but seem to be random for sufficiently short sequences. Since the calculation of the random number is carried out deterministically based on an initial value, which is also called seed, such a generated sequence of numbers is reproducible, if a known initial value is assumed. The resulting sequence of numbers is then predictable by unauthorized people, when they know the algorithm and the initial value.

Traditional true random-number generators necessitate the presence of analogue circuit elements, the implementation of which in primarily digital circuits is however often feared. For example, a true random number could be generated by means of analogue elements by scanning a noise signal the amplitude of which is random.

More widespread is however the use of a pseudo-random number generator, which does of course not provide an optimal sequence of random numbers, but can however be fully implemented in digital technique. Such a pseudo-random number generator necessitates however an initial value. If one wants to avoid that there exists in principle a possibility of backward calculation, this initial value may not be known. This necessitates the initial value of the pseudo-random number generator also to be generated in the chip itself, which is only possible based on a true random-number generator, so that the implementation of a pseudo-random number generator with a known initial value does not solve the problem of impeding a backward calculation.

Since the implementation of a analogue component, as would be necessary for generating a true sequence of random numbers, e.g. on a smart card/chip card, is possible only under certain conditions or at high costs, the problem of generating, on a smart card or another cryptographic device, a random number that cannot be calculated backward is a huge technical problem.

SUMMARY

According to an embodiment, this invention includes an apparatus for generating an initial value for a pseudo-random number generator, with an oscillator circuit configured to generate an oscillator signal, and a generator circuit configured to generate the initial value based on the oscillator signal, at least during part of a transient of the oscillator circuit.

According to an embodiment, this invention further creates a circuit with an oscillator and with an oscillator output, a period counter with an input that is coupled to the oscillator output, and a period counter output. Furthermore, the circuit includes a pseudo-random number generator with an input that is coupled to the period counter output.

Furthermore, this invention creates a chip with an oscillator and with an oscillator output, a period counter with an input that is coupled to the oscillator output, an interval predetermination input and a period counter output. Furthermore, the chip includes an interval predetermination output that is coupled to the interval predetermination input and an interval control input that is coupled to an external input.

Furthermore, this invention creates a method for generating an initial value for a pseudo-random number generator, of the method including generating an oscillator signal and determining the initial value based on the oscillator signal at least during part of a transient of the oscillator signal.

Thus, embodiments of this invention have the advantage that the initial value for a pseudo-random number generator can be generated at random economically and, in particular, without any necessity of additional or, in particular, of specially provided analogue elements, e.g. based on a number of oscillations during a starting-up procedure of an oscillator. Since the start-up phase of an oscillator depends on many parameters, such as e.g. room temperature, supply voltage, manufacture variations, etc., an initial value can be generated, which is unknown and thus makes a backward calculation considerably more difficult.

BRIEF DESCRIPTION OF THE DRAWINGS

Embodiments of the present invention will be detailed subsequently referring to the appended drawings, in which.

DETAILED DESCRIPTION

Figure 1A:
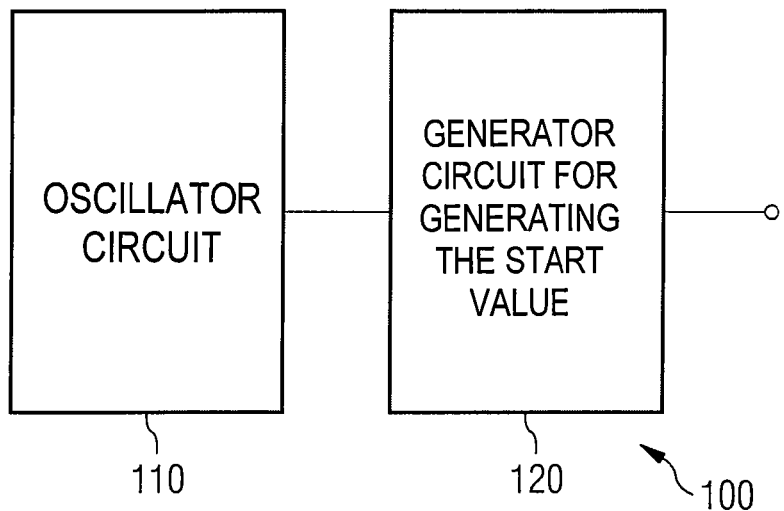
FIG. 1A is a principle block circuit diagram of an initial value generating apparatus according to an embodiment of this invention.

It is pointed out that in the following description of the figures like elements in the figures are designated by the same reference numerals, and that repeated description is omitted.

A functional diagram of an embodiment of this invention is shown in FIG. 1A. FIG. 1A shows an apparatus 100 for generating an initial value for a pseudo-random number generator. FIG. 1A shows furthermore an oscillator circuit 110 for generating an oscillator signal, after which is connected a generator circuit 120 for generating the initial value. The initial value is generated based on the oscillator signal at least during part of a transient of the oscillator circuit.

The oscillator circuit 110 can be implemented e.g. by means of a VCO (Voltage Controlled Oscillator) or an ICO (Current Controlled Oscillator), such as used e.g. in modern smart cards as an internal fast clock generator, in order to allow fast processing of programs. When switching on the component, thus when current is applied to the smart card, the oscillator circuit 110 or the VCO or ICO starts slowly, i.e. it does not oscillate immediately at the desired clock frequency, but first oscillates more slowly, the frequency of the oscillations increasing up to the desired clock frequency. The evolution of the start-up phase depends on many individual parameters, as well as on manufacture variations. Factors having an influence on the start-up characteristic of such a component are the environmental parameters, such as e.g. a supply voltage, the temperature, etc. When the speeding-up is observed over a period, e.g. by counting the clocks generated, a non-predictable value can be generated, which can then be used as an initial value for a pseudo-random number generator. Alternatively, the value so determined can serve as an input for a mathematical operation, which limits e.g. the range of values for possible initial values, such as it could e.g. brought about by a modulo division.

Figure 1B:
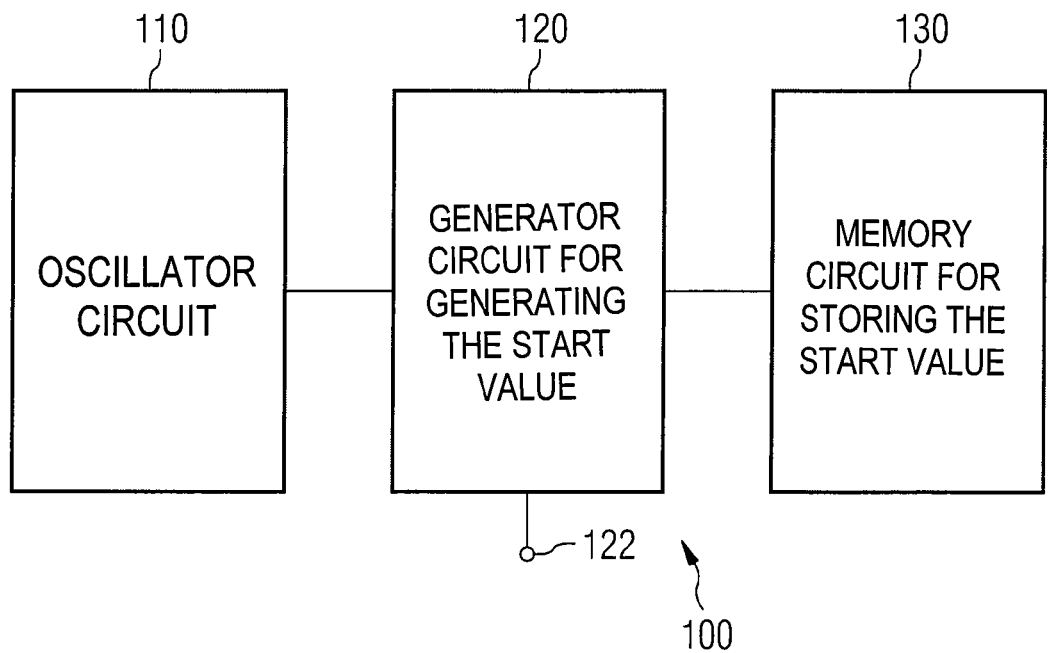
FIG. 1B is a principle block circuit diagram according to another embodiment of the present invention.

FIG. 1B shows another embodiment of this invention. The generator circuit 120 for generating the initial value has an optional control input 122 through which a counting interval can be predetermined. In the embodiment in FIG. 1B, the apparatus 100 has furthermore a memory circuit 130 for storing, which is connected after the generator circuit 120 for generating the initial value. The generator circuit 120 for generating the initial value could e.g. be designed to start the counting interval upon switching on and to end it after a signal flank at the control input 122. The signal flank for ending the counting interval could e.g. be predetermined from outside, i.e. by an external source. In the case of smart cards e.g., this signal slope could be brought about by an external reset signal, which is coupled by a terminal to the control input 122, whereby the possibility exists in principle to exercise an influence on the duration of the counting interval through a further random variable, namely the duration of the counting interval.

In the embodiment shown in FIG. 1B, the apparatus 100 for generating an initial value for a pseudo-random number generator has, furthermore, a memory circuit 130 for storing. The memory circuit 130 for storing stores the initial value, which, depending upon the field of application is generated e.g. only once during the production of the apparatus 100, and can then be retrieved from the memory circuit 130 for storing, the memory circuit 130 for storing having then a non-volatile memory, or is also generated anew at each switching on and used during the period it is switched on. In another embodiment, the initial value is, according to the invention, generated only once and stored in the memory circuit 130 for storing.

When addressing the pseudo-random number generator, the latter provides a new initial value, which is then stored in the memory circuit 130, in order to be used at a next switching on or addressing of the pseudo-random number generator. Thus, in an embodiment of the invention, a repetition of a sequence of random numbers after each switching on can be avoided. In this embodiment, the memory circuit 130 also has a non-volatile memory. A non-volatile memory can be implemented e.g. by means of fuse structures or so-called soft fuses.

Figure 2A:
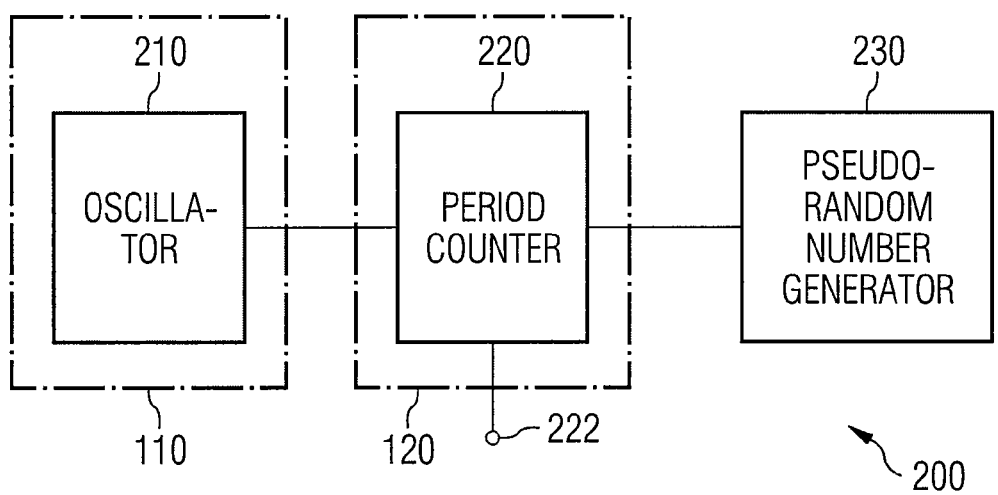
FIG. 2A is a principle block circuit diagram of a circuit according to an embodiment of the present invention.

FIG. 2A shows another embodiment of this invention. The components according to the invention are also shown here according to FIGS. 1A and 1B. In FIG. 2A is shown a circuit, which has an oscillator 210 with an output, a period counter 220 connected after the oscillator 210, with an input and an output, and a pseudo-random number generator 230 with an input. The output of the oscillator 210 is coupled to the input of the period counter 220, the output of the period counter 220 is, in turn, coupled to the input of the pseudo-random number generator.

During a start-up phase of the oscillator 210, the period counter 220 determines a number of oscillation periods based on a counting interval over a time period. The counting interval can begin e.g. when switching on the period counter and end after a predetermined period of time. The period counter can optionally have a control terminal 222 through which a counting interval can be predetermined, similarly to the above description. Here too, e.g. an external reset signal could serve for ending the counting interval, whereby, here too, a possibility is created of inserting, through varying the duration of the counting interval, an additional variable component into the process. The reset signal is provided by an external instance, such as e.g. by a terminal. Similarly to the above embodiment, the period counter can reproduce or limit the initial value so determined by a mathematical manipulation to a range of values, before transmitting the final initial value to the pseudo-random number generator 230. The period counter could have e.g. an overflow register, and thus inherently perform a modulo operation based on the number of periods counted in the oscillator signal.

Figure 2B:
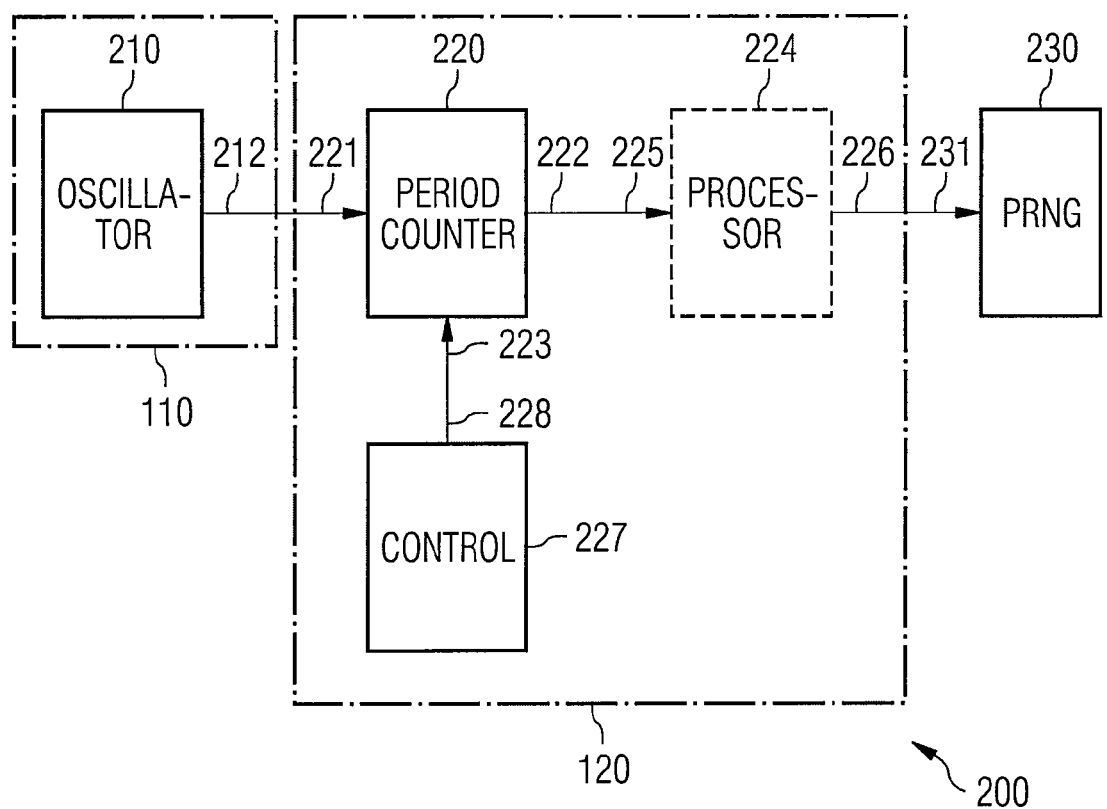
FIG. 2B is a principle block circuit diagram of a circuit according to another embodiment of the present invention.

FIG. 2B shows another embodiment of this invention. The oscillator circuit 110 and the generator circuit 120 for generating the initial value are also shown according to FIGS. 1A and 1B. Here, the oscillator circuit 110 has an oscillator 210 with an output 212, which could be implemented e.g. by means of a VCO. In FIG. 2B, the generator circuit 120 for generating the initial value includes three components, a period counter 220 with an input 221 that is coupled to the output 212 of the oscillator 210, an output 222 and a control input 223, an optional processor 224 with an input 225 that is coupled to the output 222 of the period counter 220 and an output 226, and a control 227 with an output 228 that is coupled to the control input 223 of the period counter 220. Furthermore, FIG. 2B shows a pseudo-random number generator 230 with an input 231 that is coupled to the output 228 of the processor 224.

The period counter 220 determines the number of oscillation periods in the oscillator signal during a counting interval, which is predetermined by the control 227 for the period counter 220. The beginning of a counting period could e.g. be the switching on of the arrangement, the control 227 could predetermine the end of the counting interval. This could occur e.g. by charging a condenser, through an external signal, or also by a random period. At the end of the counting interval, the period counter 220 transmits the number of oscillation periods in the oscillator signal determined during the counting interval to the optional processor 224. This processor performs e.g. a mathematical operation, such as e.g. a modulo operation, based on the number determined by the period counter 220. A modulo operation could, in another embodiment, also be implemented by a period counter with overflow. Then the processor 224 transmits the desired initial value to a pseudo-random number generator 230. The mathematical operation by the processor serves e.g. for reproducing the initial value within a valid range of values of the pseudo-random number generator. According to the field of application, the processor can also be omitted in embodiments of this invention and the output 222 of the period counter 220 could be coupled directly to the input 231 of the pseudo-random number generator 230.

Figure 2C:
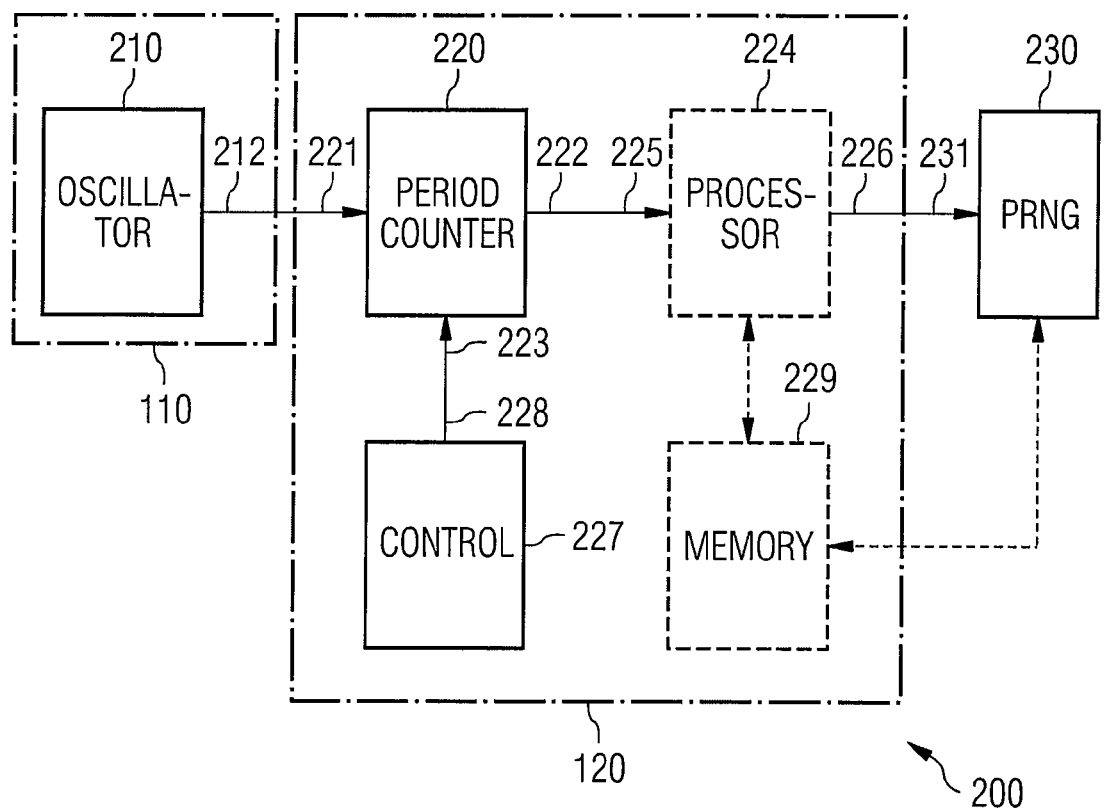
FIG. 2C is a principle block circuit diagram of a circuit according to another embodiment of the present invention.

In FIG. 2C is shown another embodiment containing the same components as those already explained with reference to FIG. 2B and, in addition, a memory 229. The memory serves, like in the above explanation, for storing initial values. The memory 229 can be coupled to the processor 224 or the pseudo-random number generator, which is shown in FIG. 2C by broken lines. In an embodiment of this invention, an initial value is determined only once during the production, which is then stored in the memory 229 and is subsequently retrieved from it. Alternatively, combinations between the stored value and new determined values can also be used for determining the initial value. In this case, the memory 229 has non-volatile memory components. In another embodiment, after each run of the pseudo-random number generator 230 the initial value is stored again by the latter in the memory 229 and each time retrieved from it. In this variant, combinations between the stored value and new determined values can also be contemplated for determining the initial value. In this embodiment of the invention, this prevents random sequences from being repeated. Here too, the memory 229 can have non-volatile memory components.

In another embodiment, the initial value is determined anew by the circuit shown in FIG. 2C at each switching on and then for the stored in the memory 229 for the duration of the operation, or, like in the above embodiment, replaced by the pseudo-random number generator 230 after each iteration. In another embodiment of this invention, the last value stored serves as the initial value for a next run. The memory 229, which in this case is implemented as a non-volatile memory, then provides the last value stored either to the processor 224 or to the pseudo-random number generator 230. In an embodiment, a new initial value is based on an arithmetic operation of the last random number, so that the memory 229 receives the last random number from the pseudo-random number generator and provides it, at the next switching-on process or also after a reset, to the processor.

Alternatively, instead of an indirect coupling of the pseudo-random number generator 230, through a processor 224, to the output of the period counter 220, there can also be a direct coupling and the output value of the period counter 220 can be connected directly to the input of the pseudo-random number generator 230. In an embodiment, the period counter 220 can have an overflow register and, thus, inherently perform e.g. a modulo operation. In this embodiment, the processor could be omitted and the memory 229 would thus be coupled directly to the output of the period counter and could, as described above, provide the initial value to the pseudo-random number generator.

Figure 3:
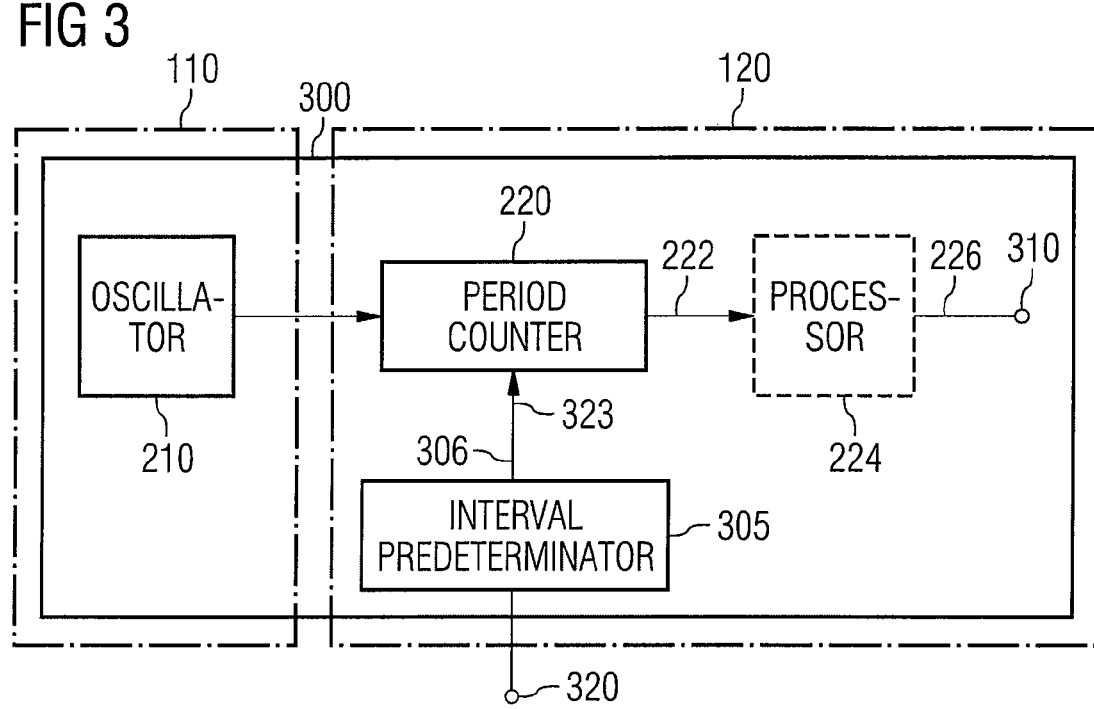
FIG. 3 is a principle block circuit diagram of a chip according to an embodiment of the present invention.

FIG. 3 shows a chip 300 according to another further embodiment of this invention. In FIG. 3 are shown again the oscillator circuit 110 and the generator circuit for generating the initial value 120. Furthermore, FIG. 3 shows the oscillator 210, the period counter 220 and the optional processor 224, which, like in FIGS. 2B and 2C, are already coupled to each other. FIG. 3 shows furthermore an interval predeterminator 305, which is coupled, at an output 306, to the control input 223 of the period counter 220 and an external interface 320, which are implemented on a common substrate 300. The output 226 of the processor 224 is connected to an output terminal 310 for transmitting the calculated initial value. In another embodiment, the output terminal 310 can, optionally, be coupled directly to the output 222 of the period counter and the optional processor 224 can be omitted. In another embodiment of this invention, a pseudo-random number generator can in addition be implemented on the chip 300, which is coupled directly to the output terminal 310, so that the initial value and the pseudo-random number generator are present in an integrated form on a substrate.

The counting interval during which the period counter 220 determines the number of oscillation periods in the oscillation signal provided by the oscillator 210 is predetermined by the interval predeterminator 305, which is furthermore coupled to an external interface 320 through which can be coupled a control signal external to the chip. Thus, the observation period, i.e. the counting interval can both be predetermined internally to the chip, e.g. by a fixed period or also through charging a capacity depending on the supply voltage and made depending from other external effects. For example, a number of oscillation periods can be counted between the supply of current to the component, i.e. the chip 300, and the "releasing" of an external reset line. This reset line could e.g. be controlled by a terminal and is subject, as established e.g. in an ISO standard, to a least activity time. By proceeding in this way, there would be achieved, in an embodiment of this invention, that, from terminal to terminal and even from start-up to start-up, the duration of the counting interval would vary, and that an additional variation component or another random variable could be inserted into the process. The counting value, which is then output at the output 310 of the optional processor 224, or at the output 223 of the period counter 220, can then be used as an initial value for the pseudo random number generator, which, in an embodiment, can also be located on the same chip.

According to the embodiments already explained, this embodiment can also have, in addition, a memory that can e.g. also be implemented on the chip or is coupled, through an external connection, to the processor 224 or the period counter 220.

Figure 4:
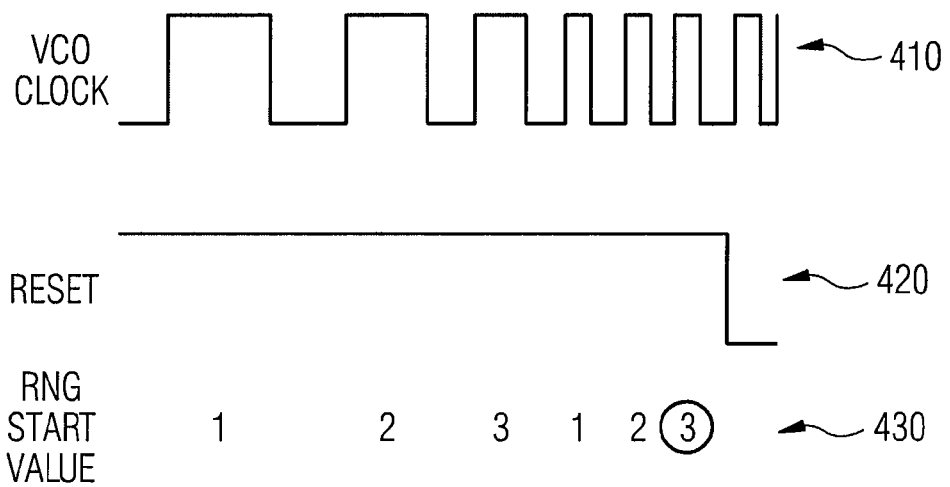
FIG. 4 shows principle waveforms of an oscillator, of an interval predetermination signal and of an algorithm for calculating an initial value according to an embodiment of the present invention.

In order to explain this procedure, FIG. 4 shows examples of waveforms 410, 420 and 430. FIG. 4 illustrates the waveform 410 of an oscillator 210 during a start-up phase, which could e.g. be implemented by means of a VCO or an ICO, and which provides an increasing clock. In FIG. 4, the waveform 420 shows furthermore the flank of a reset signal, which could e.g. be connected to the interface 320 of the embodiment of this invention shown in FIG. 3. The period counter 220 now begins to count the periods in the waveform 410 of the VCO clock, and transmits the counting value to a processor 224. The processor 224 could perform e.g. a modulo operation. An embodiment of a modulo operation is represented in FIG. 4 as a sequence 430 of modulo values. The falling flank of the waveform 420 of the reset signal ends the counting interval, after which the initial value is transmitted by the processor 224 e.g. at an output 310 to a pseudo-random number generator. In the exemplary waveforms in FIG. 4 is determined in this way an initial value of 3. In the example of FIG. 4, the processor 224 performs a modulo operation on the basis of 3.

The above embodiments can easily be used in security controllers, which are equipped with a CPU, as well as various peripheral modules, among which also an internal oscillator (e.g. a VCO or an ICO). They must however not have a true random-number generator. The above embodiments now allow generating, at the start of a program or also once during the production, during a speeding-up phase of the oscillator, an initial value that is based on a random variable. The counting interval can be fixed through a fixed period, a random period or also a period predetermined externally, such as e.g.

through a reset signal. This offers the possibility of basing the determination of an initial value on another random variable, namely the duration of the counting interval. Embodiments according to the invention could furthermore have a memory circuit, which, e.g. upon a single-time determining of an initial value during the production, stores the latter in its memory, so that it can be read at future retrievals. Another embodiment of this invention would be an apparatus, a chip or a method, which has in addition a memory circuit for storing an initial value, the memory circuit of a pseudo-random number generator storing each time new initial values, so that the initial value determined according to the invention is used only once.

In another embodiment, the method described above is implemented in a computer program, which runs e.g. on a microprocessor or also a microcontroller.

The above embodiments create an apparatus, a method, a computer program, a circuit and a chip, which allow, e.g. by using a VCO start-up phase, determining initial values, or so-called seeds, for pseudo-random number generators so that even a manufacturer of such a pseudo-random number generator does not have any knowledge of the initial value, and that an increased security can thus be achieved, in particular as regards encrypting algorithms, etc.

In particular, the attention is drawn on the fact that according to the circumstances, the scheme according to invention can also be implemented in software. The implementation can occur on a digital storage medium, in particular a disk or CD with electronically readable control signals, which can cooperate with a programmable computer system and/or microcontroller so that corresponding methods can be carried out. Generally, the invention thus also consists in a computer program product with a program code stored on a machine-readable carrier for carrying out the method according to the invention when the computer program product runs on a computer and/or microcontroller. In other words, the invention can be implemented as a computer program with a program code for carrying out the method when the computer program runs on a computer and/or a microcontroller.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

What is claimed is:

1. An apparatus for generating an initial value for a pseudo-random number generator, comprising:
    an oscillator circuit configured to generate an oscillator signal; and
    a generator circuit configured to generate the initial value based on the oscillator signal at least during part of a transient of the oscillator circuit, and to seed the pseudo-random number generator using the initial value.

2. The apparatus according to claim 1, wherein the generation of the initial value by the generator circuit depends on a number of periods in the oscillator signal during a counting interval, the counting interval starting at the application of a voltage supply or a switch-on process with respect to the apparatus and comprising a predefined duration.

3. The apparatus according to claim 1, wherein the apparatus is integrated on a chip and the generation of the initial value by the generator circuit depends on a number of periods in the oscillator signal during a counting interval, the counting interval being adjustable from outside the chip.

4. The apparatus according to claim 1, wherein the apparatus for generating the initial value further comprises a memory circuit for storing an initial value.

5. The apparatus according to claim 1, wherein the generation of the initial value by the generator circuit includes an arithmetic operation based on a number of periods occurred in the oscillator signal.

6. The apparatus according to claim 1, which is integrated in a chip.

7. The apparatus according to claim 1, wherein the generator circuit is configured to generate the initial value based on a count of oscillation periods of the oscillator signal during a counting interval within the transient of the oscillator circuit, the transient representing a start-up phase of the oscillator circuit.

8. The apparatus according to claim 7, wherein the generator circuit is configured to apply a modulo operation onto the count of the oscillation periods in order to obtain the initial value.

9. The apparatus according to claim 7, which is integrated in a chip comprising an external interface, wherein the generator circuit is configured such that the counting interval is influenced by a chip-external control signal applied to the external interface.

10. The apparatus according to claim 7, which is integrated in a chip comprising an external interface, wherein the generator circuit is configured such that the counting interval starts upon a supply of current to the chip and ends depending on a chip-external control signal applied to the external interface.

11. The apparatus according to claim 7, which is integrated in a chip comprising an external interface, wherein the generator circuit is configured such that an end of the counting interval is determined by charging a capacity depending on a supply voltage of the chip.

12. The apparatus according to claim 7, further comprising a memory circuit for storing, in a non-volatile manned, the initial value, wherein the apparatus is integrated in a chip, and the generator circuit is configured to generate, upon newly supplying voltage to the chip, a further initial value based on the oscillator signal at least during part of the transient of the oscillator circuit occurring upon the anew supply of voltage to the chip, and the initial value stored in the memory circuit.

13. The method according to claim 1, wherein the generation of the initial value is based on a count of oscillation periods of the oscillator signal during a counting interval within the transient of the oscillator circuit, the transient representing a start-up phase of the oscillator circuit.

14. The method according to claim 13, wherein the generating comprises applying a modulo operation onto the count of the oscillation periods in order to obtain the initial value.

15. A method for generating an initial value for a pseudo random-number generator, comprising:
    generating an oscillator signal;
    determining the initial value based on the oscillator signal, at least during part of a transient of the oscillator signal; and
    seeding the pseudo-random number generator using the initial value.

16. The method according to claim 15, wherein determining the initial value further comprises counting periods in the oscillator signal during a counting interval.

17. The method according to claim 15, wherein determining the initial value further comprises performing an arithmetic operation on a number of periods in the oscillator signal during a counting interval.

18. The method according to claim 15, further comprising predetermining a counting interval.

19. The method according to claim 18, wherein the predetermining is based on a switch-on process and on a change of level of an external signal.

20. The method according to claim 19, further comprising coupling to a communication device that provides the external signal.

21. The method of claim 15, wherein the steps of generating and determining are performed within one chip.

22. A method for generating an initial value for a pseudo random-number generator, comprising:
   generating an oscillator signal; and
   counting the periods in the oscillator signal, at least during part of a transient of the oscillator signal, the initial value being based on the result of the counting,
   wherein the initial value is used to seed the pseudo-random number generator.

23. A computer storage medium having a computer program with a program code for performing a method for generating an initial value for a pseudo-random number generator comprising determining the initial value based on an oscillator signal, at least during part of a transient of the oscillator signal, and seeding the pseudo-random number generator using the initial value, when the computer program is executed on a computer.

24. An apparatus for generating an initial value for a pseudo-random number generator, the apparatus comprising:
   an oscillation means for generating an oscillator signal; and
   a generator means for generating the initial value based on the oscillator signal at least during part of a transient of the oscillation means, and for seeding the pseudo-random number generator using the initial value.

* * * * *